United States Patent [19]

Harris

[11] Patent Number: 5,170,546
[45] Date of Patent: Dec. 15, 1992

[54] INDEXING MACHINE WITH ROTARY CAM DRIVE

[75] Inventor: William O. Harris, East Cleveland, Ohio

[73] Assignee: Overton Corporation, East Cleveland, Ohio

[21] Appl. No.: 838,864

[22] Filed: Feb. 21, 1992

[51] Int. Cl.$^5$ .............................................. B23Q 7/03
[52] U.S. Cl. .................................. 29/33 P; 198/343.1; 198/832.1
[58] Field of Search ............. 29/564, 563, 38 D, 33 P; 74/24, 54, 37, 89.2, 89.21; 198/343.1, 343.2, 812, 832.1, 465.4; 414/746.7, 905

[56] References Cited

U.S. PATENT DOCUMENTS

| | | | |
|---|---|---|---|
| 1,973,196 | 9/1934 | Baker | 198/461 |
| 2,369,540 | 2/1945 | Delamere | 226/95 |
| 2,551,080 | 5/1951 | Allen et al. | 198/343.1 |
| 3,066,758 | 12/1962 | Turner | 184/7 |
| 3,256,970 | 6/1966 | Fievet | 198/343.1 |
| 3,263,512 | 8/1966 | Handley | 74/54 |
| 3,482,077 | 12/1969 | Kleinman | 392/361 |
| 3,596,779 | 8/1971 | Osteen | 414/905 |
| 3,731,545 | 5/1973 | Beezer | 74/24 |
| 3,850,566 | 11/1974 | Moore | 425/387 |
| 4,653,972 | 3/1987 | Lewis | 198/465.4 |
| 4,969,368 | 11/1990 | Sekine et al. | 74/54 |

FOREIGN PATENT DOCUMENTS

| | | | |
|---|---|---|---|
| 657217 | 1/1965 | Belgium | 29/33 P |
| 42758 | 4/1981 | Japan | 74/89.2 |

Primary Examiner—William Briggs
Attorney, Agent, or Firm—Thomas Hooker

[57] ABSTRACT

An indexing machine includes a continuous chain having a run extending between a pair of movable sprocket gears. Work carriers are provided at spaced intervals along the chain and a plurality of fixed work stations are located at equal intervals along the chain run. The machine includes a drive for continuously moving the chain and a cam rotated by movement of the chain for moving the sprocket gears back and forth and alternately accelerating movement of the chain in the run and dwelling the chain in the run with work carriers located adjacent work stations.

23 Claims, 3 Drawing Sheets 5,170,546

INDEXING MACHINE WITH ROTARY CAM DRIVE

FIELD OF THE INVENTION

The invention relates to indexing machines driven by a continuous rotary input for moving a plurality of work carriers on a chain rapidly between work stations and then dwelling the carriers at the work stations.

DESCRIPTION OF THE PRIOR ART

Power indexing machines using a chain with work carriers spaced along the chain and a rotary drive to index the chain along the work path between work stations and then slow the chains and carriers at the work stations are known in the art. These machines permit indexing of work parts between stations and loading and unloading of the parts while slowed at the stations.

SUMMARY OF THE INVENTION

The disclosed indexing machine includes an improved rotary cam drive attached to one of a pair of spaced sprocket gears which are mounted on the opposite ends of a slide bar. A continuous chain is wrapped around the sprocket gears. A continuously operated chain drive moves the chain around both sprocket gears and along an intermittent movement run extending between the gears. Work carriers are spaced along the chain. Rotation of a cam plate mounted on one of the sprocket gears moves a cam slot past a fixed roller cam follower thereby translating the slide bar, gears and chain back and forth along the direction of movement of the intermittent run. Movement of the slide in one direction accelerates movement of the chain in a feed direction along the run to rapidly move work in carriers on the chain between adjacent work stations. Movement of the slide bar and sprockets and chain in the opposite direction dwells movement of the carriers at the work stations to permit loading and unloading of work parts and work operations. The dwell period produced by the cam may be one-half of the total cycle time with the transit time for moving work carriers between the stations being approximately one-half of the cycle time. In this way, the work parts are very rapidly moved between stations and dwelled at the stations for relatively long periods. The indexing machine operates smoothly with gradual acceleration and deceleration which further facilitates rapid indexing of work parts with long dwell periods between indexing movements.

Other objects and features of the invention will become apparent as the description proceeds, especially when taken in conjunction with the accompanying drawings illustrating the invention, of which there are 3 sheets and one embodiment.

DESCRIPTION OF THE PREFERRED EMBODIMENT

Figure 2:
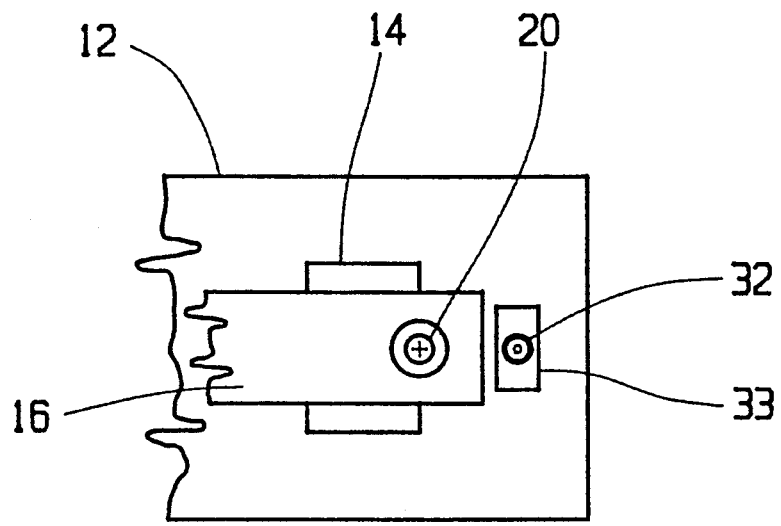
FIG. 2 is a top view of one end of the slide bar with the chain, small diameter sprocket gear and cam removed.
Figure 4:
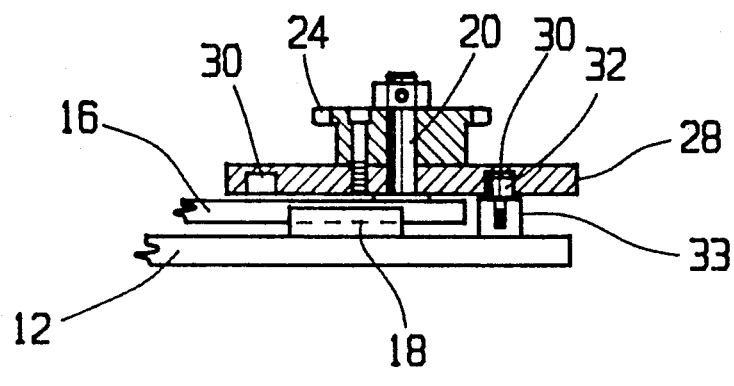
FIG. 4 is a partially broken away side view taken in the direction of arrow 4 of FIG. 3.

Indexing machine 10 includes a base 12 with guide block 14 mounted on the base. A slide bar 16 is fitted within slot 18 in block 14 for longitudinal movement along the slot relative to the base. Fixed shafts 20 and 22 extend upwardly from the ends of the slide bar and rotatably support small diameter sprocket gears 24 and 26. A rotary cam plate is bolted to the bottom of sprocket gear 24 and is provided with a continuous cam slot 30 facing base 12. A fixed rotary cam follower 32 is mounted on base 12 and has a close sliding fit within the cam slot 30. See FIG. 4. FIGS. 2 and 4 illustrate that the follower is mounted on a support 33 which is attached to base 12. The fixed follower is located outside sprocket gear 24. In another embodiment of the invention, the follower may be located between the axis of rotation of sprocket gears 24 and 26 in a slot in bar 16 for use with a suitable cam plate on gear 24.

Figure 1:
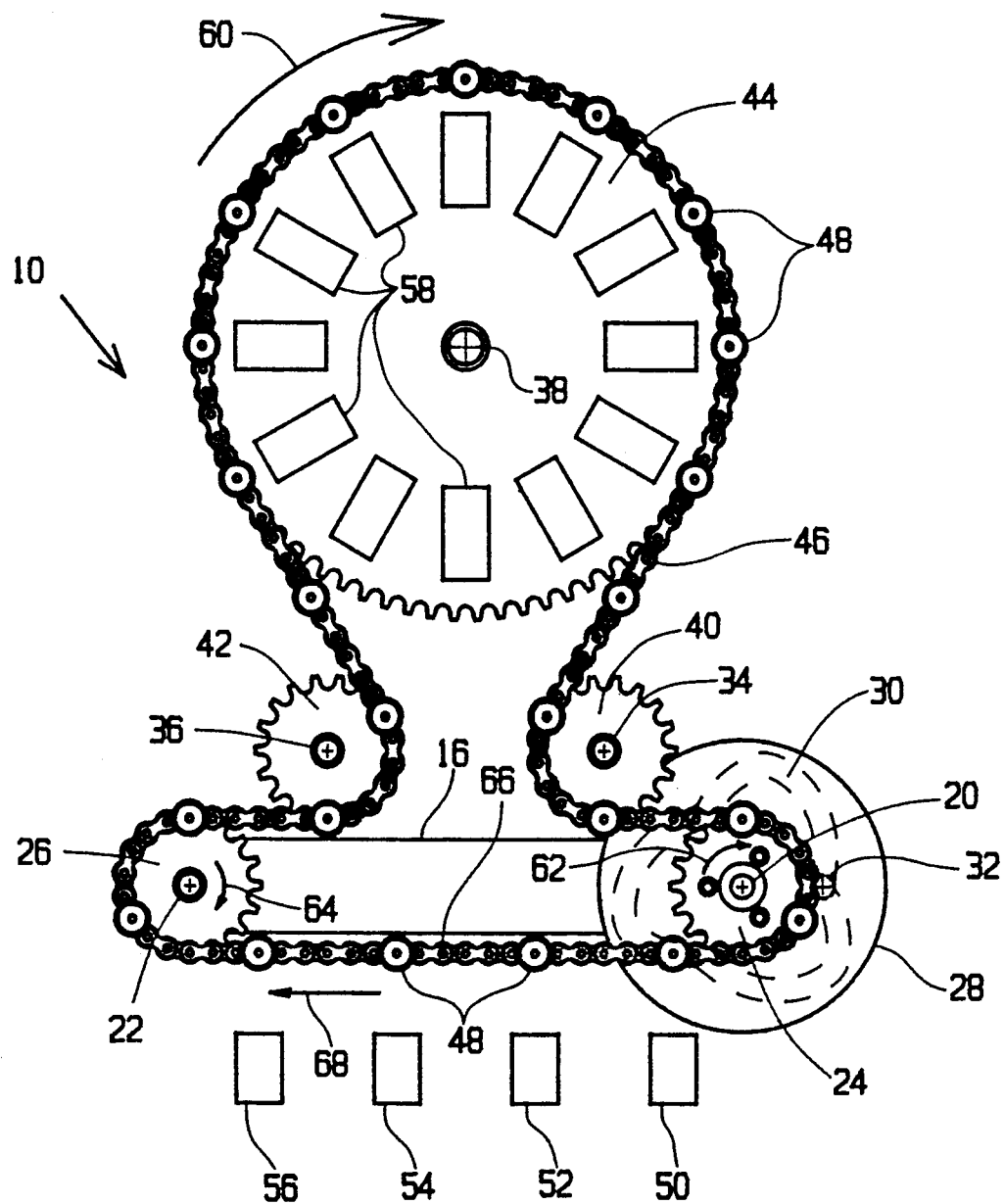
FIG. 1 is a top view of an indexing machine in which a continuous chain is wrapped around a large diameter sprocket gear, a pair of small diameter fixed sprocket gears and small diameter sprocket gears mounted on the opposite ends of a slide bar.

A pair of fixed shafts 34 and 36 are mounted on base 12 to one side of the slide bar. Additional fixed shaft 38 is also mounted on the base further away from the slide bar than shafts 34 and 36. Small diameter sprocket gears 40 and 42 are rotatably mounted on shafts 34 and 36. A large diameter sprocket gear or carousel 44 is mounted on shaft 38. Continuous chain 46 is wrapped around the sprocket gears 44, 40, 24, 26 and 42 as shown in FIG. 1.

Chain 46 carries a number of work carriers 48 spaced at regular intervals along the length of the chain. A plurality of fixed work stations 50, 52, 54 and 56 on base 12 are located adjacent the intermittent movement run 66 of chain 46 extending between sprocket gears 24 and 26. These stations are spaced apart a distance equal to the spacing between the work carriers 48 on chain 46. A plurality of work stations 58 are spaced around the circumference of large diameter sprocket gear 44 with each station 58 located adjacent a work carrier 48 on the portion of the chain wrapped around gear 44.

The indexing machine is operated by a rotary drive (not illustrated) connected to one of the small diameter sprocket gears 40, 42 or to the large diameter sprocket gear 44. The drive continuously rotates the driven sprocket gear to move the chain around the five gears of the indexing machine in the direction of arrow 60 as shown in FIG. 1.

Movement of the chain by the driven sprocket gear rotates both sprocket gears 24 and 26 in a clockwise direction as indicated by arrows 62 and 64 so that the run 66 of chain 46 extending between the two gears 24 and 26 has a net movement in the direction of arrow 68 relative to gears 24 and 26. Rotation of sprocket gear 24 rotates cam 28 and cam slot 30 past follower 32 thereby varying the distance between the fixed follower and shaft 20 on slide 16 and moving the slide back and forth in slot 18 in guide block 14 to provide an additional component of movement to chain run 66 beyond the movement in response to the continuous rotation of the driven sprocket gear.

The cam slot 30 includes three like high points 70 located a maximum distance from the shaft 20 and three valleys 72 each located between adjacent high points 70 located a minimum distance from shaft 20. The rotary angle between a high point 70 and the adjacent valley 72 in the direction of rotation of the plate 28 is about 40 degrees and the rotary angle between a valley 72 and adjacent high point in the direction of rotaries is about 80 degrees.

Figure 3:
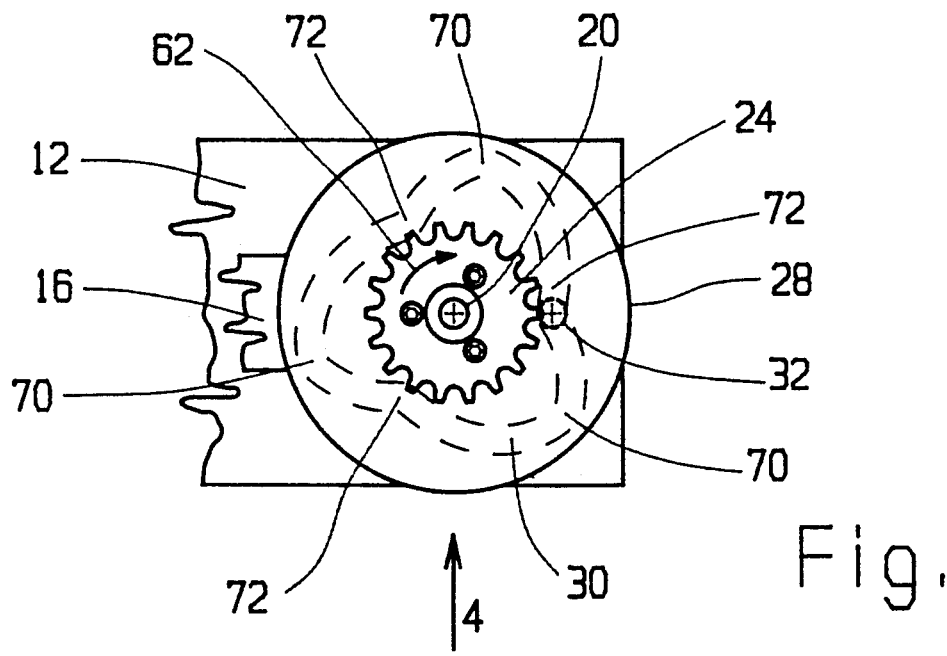
FIG. 3 is similar to FIG. 2 also showing a sprocket gear and drive cam.

As shown in FIG. 3, follower 32 is located near a valley 72 and, as a result, the slide bar 16 and sprockets 24 and 26 are located in a near maximum position to the right as viewed in FIG. 1. Further rotation of the cam plate 28 in the direction of arrow 62 moves the follower 32 to a high point 70 thereby shifting the slide bar to a maximum position to the left of the position shown in FIG. 1.

The cam slot 30 is provided with three sets of like high points 70 and valleys 72 so that the slide bar is moved back and forth relative to base 12 three times during each revolution of the cam plate. A full cycle of movement of the slide bar occurs during each 120 degrees of rotation of the plate. If desired, the cam slot may be provided with additional or fewer peaks and valleys to vary the number of cycles of movement of the slide bar for each revolution of the plate. For instance, the cam slot may be dimensioned to include a single peak and a single valley to provide a single extension and retraction of the slide bar per each revolution of the plate. The cam slot may be provided with more than three like peaks and valleys to provide more than three oscillations of the slide bar per revolution of the plate. The spacing of the work stations along run 66 must be changed consistent with the geometry of the cam slot to assure proper operation of the machine 10.

The indexing machine 10 is used to move work parts which are placed in the work carriers 48 on chain 46 during manufacturing operations. The operation of the indexing machine 10 will now be described.

The driven gear 40, 42 or 44, continuously moves chain 46 around the five gears of the indexing machine. Rotation of gear 24 by the chain rotates the cam plate 28 to translate bar 16 and gears 24 and 26 back and forth with respect to the base 12 three times during each revolution of the plate, as described. Translation of the slide bar moves chain run 66 forward in the direction of arrow 68 as the follower 32 moves from each valley 72 to a high point 70 and moves the run in a direction opposite to the direction of arrow 68 as the follower is moved from a high point 70 to a valley 72. At the same time, the continuous rotation of the drive gear moves the chain in run 66 in the direction of arrow 68.

In the position shown in FIG. 1, follower 32 is located near a valley 72 and the work carriers 48 on run 66 are each located adjacent a work station 50, 52, 54 and 56. Continued rotation of the cam plate 28 positions the follower at the adjacent high point 70. This movement increases the distance between the follower 32 and the axis of shaft 20 thereby assuring that the chain in run 66 and the carriers and work on the carriers in the run are rapidly moved to the left in the direction of arrow 68. During movement of the bar 16 through this portion of the cam slot the chain in run 66 quickly moves a distance in the direction of arrow 68 equal to the spacing between a pair of work stations 50, 52, 54 and 56. Carriers 48 are indexed to the next downstream work station Continued rotation of the cam plate 28 moves the follower from the high point 70 to the next valley 72 and, at the same time, moves the slide bar 16 and sprockets 24 and 26 to the right in a direction opposite to the direction of the continuous movement of the chain 46. During this portion of the cycle of operation, the movements of the chain created by the movement of the slide bar to the right and the clockwise rotation of the sprocket gears 24 and 26 to the left are equal and opposite so that the work carriers 48 are dwelled for a long period directly opposite the work stations 50, 52, 54 and 56.

The rapid forward feeding of intermittent run 66 and dwell of the run occurs three times during each rotation of the cam plate. During operation of machine 10 the continuously rotated drive sprocket gear rotates sprocket 44 and moves chain 46 around the shaft 38 at a continuous rate with each of the work stations 48 on the chain located opposite a work station 58 on the sprocket gear acceleration forces.

The indexing machine may be used to carry work parts from a loading station and perform a series of operations on the work parts prior to removal of the work parts at a discharge station. For instance, work parts may be loaded on dwelled work carriers 48 at loading station 52. The loaded work is then quickly moved downstream and dwelled at a work station 54 where work is performed on the motionless part. The part is then rapidly moved downstream to work station 56 at which a further operation is performed on the part. During subsequent movement of the chain 46 the work part is carried to the large sprocket gear 44 and is located adjacent a rotary work station 58 on the gear for performance of further work during rotation as the carrier carrying the work is continuously rotated with gear 44. Finally, the carrier and work are returned and dwelled at removal station 50 at which time the completed work is removed from the work carrier.

Figure 6:
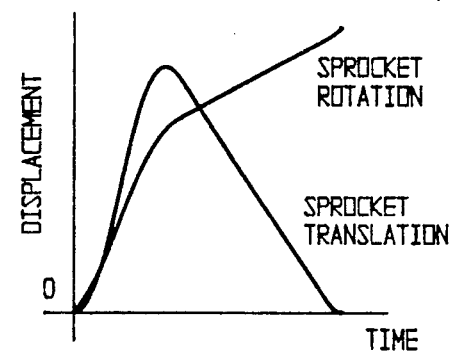
FIGS. 5, 6 and 7 are graphs illustrating the parameters of operation of the indexing machine.
Figure 5:
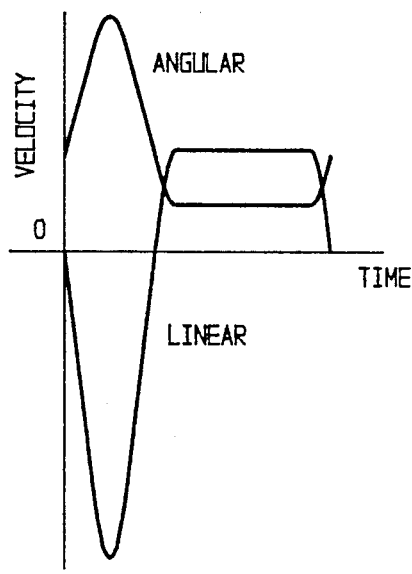
Figure 7:
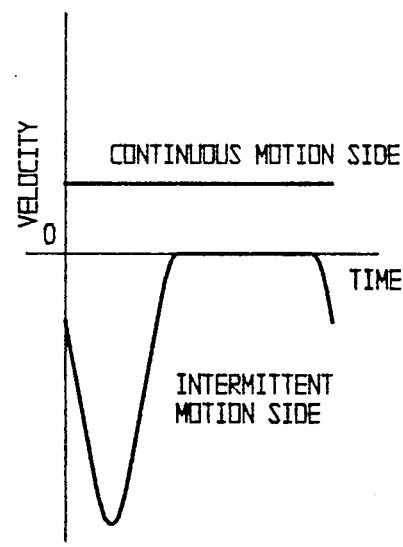

FIGS. 5, 6 and 7 are representative of operation of the indexing machine during each 120 degree rotation of cam plate 28 during which the follower 32 is moved from a valley 72 to a high point 70 and back to a valley 72.

The graphs of FIG. 5 represent the linear and angular speeds of the sprocket 24 and cam plate 28 during one 120 degree clockwise cycle of operation during which the follower 32 is moved from a valley 72 past a high point 70 and back to the next valley 72. In the first 80 degree part of the rotation of the sprocket and cam plate, the follower is moved from a valley to a high point. During this movement, the sprocket is translated away from the follower and its linear and angular velocities rapidly increase and decrease. These movements advance the run 66. This is the longer more gradual side of the cam slot 30 even though this movement from the valley 72 to the peak 70 happens in less time than the movement back from the peak 70 to the valley 72 because the cam 28 is rotating very rapidly during this time. During the remainder 40 degrees of the 120 degree period, the follower is moved from the high point back to the next valley 72, and the linear velocity increases, remains constant for a substantial percentage of time, then decreases and returns to zero when the follower reaches the valley. At the same time, the angular velocity decreases, remains constant for a substantial period of time and then increases. These movements dwell the run 66. This is the shorter, steeper side of the cam slot 30 even though the movement from the peak 70 to the valley 72 takes more time than the movement from the valley 72 to the peak did because the cam 28 is rotating slower during this time. The cam slot depicted in FIG. 1 has a long first portion extending between a valley and the next adjacent high point in the direction of rotation, which has a rotary angle greater than the rotary angle of the second short portion of the slot extending between a high point and the next adjacent valley in the direction of rotation. The chain run 66 is dwelled when the follower is traveling through the second short portion of the cam slot. Chain run 66 moves in the direction of arrow 68 when the follower is traveling through the long first portion of the cam slot.

FIG. 6 illustrates the rotational and translation displacement of the sprocket gear 24 as a function of time during 120 degree rotation of the gear and cam plate. During the first portion of rotation, while the follower is moved from a valley to a high point, the rotational and translational displacements move rapidly. During the remainder of the 120 degree rotation, the rotational and translational displacement of the sprocket gears slow and remain constant for a substantial percentage of the time.

FIG. 7 illustrates the chain speed for the intermittent motion run 66 during the 120 degree rotation of the sprocket gear and the velocity of the continuous motion side of the chain, that is, the remainder of the chain that is wrapped around sprockets 42, 44 and 40. As indicated, the continuous motion side of the chain is moved at a constant velocity in response to the continuous rotation of the driven sprocket. However, the intermittent side or intermittent run 66 is dwelled for one-half of the 120 degree cycle due to the motion imparted to the intermittent run in the direction of arrow 68 by the continuous rotation of the drive sprocket being canceled by the opposite motion of the slide bar 16 and both sprocket gears 24 and 26 to the right as follower 32 moves from a high point 70 to a valley 72.

In this way, the work carriers 48 are rapidly indexed between work stations 50, 52, 54 and 56 during approximately one-half of the duration of each 120 degree cycle and are dwelled at the respective work stations during approximately one-half of the duration of the cycle. The rapid indexing and long dwell periods permit loading and unloading of work parts onto and from the carriers 48 and provide relatively long dwelled intervals for performing work operations at fixed work stations.

Indexing machine 10 may be used in manufacturing operations where repetitive operations need to be rapidly performed on a series of work parts. For instance, the indexing machine may be used to fill and seal containers. Successive containers may be positioned in work carriers 48 when dwelled at loading station 52. These carriers are then moved downstream to work station 54 where the containers are filled during dwell. Subsequent movement of the containers to work station 56 permits placing the heat shrink wrap on the filled containers. As the containers are moved through the continuous motion side of the chain and around the sprocket gear 44 individual containers are positioned adjacent heating work stations 58 to permit heating and shrinking of the caps. The carriers are subsequently moved to unloading station 50 where the filled and sealed containers are unloaded during dwell of the work carrier. The use of the indexing machine for filling and sealing containers is illustrative of number of high speed manufacturing operations and is included by way of example only. Also, the spacing between sprockets 24 and 26 may be increased to provide a longer intermittent feed run 66 with additional work stations spaced along the run.

The indexing machine 10 has been described using chains and sprocket gears. Clearly the chain may be replaced by equivalent belts, strands or other endless carriers and the gears may be replaced by equivalent pulleys, rollers and the like within the scope of the invention. In some applications, the manufacturing operation may not require associating the work part with a work station during a long period of time. In these applications, the chain 46 may extend directly from sprocket gear 26 back to gear 24 thereby eliminating the gears 40, 42 and 44. In such a case, a suitable chain drive is provided. The drive may engage the portion of the chain extending between gears 26 and 24 in order to drive the machine. Alternatively, the drive may continuously rotate one of the sprocket gears 24 or 26. Driving sprocket gears 24 and 28 at a constant rotary speed results in a shorter dwell and in different chain speeds than those shown in FIGS. 5, 6 and 7.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. An indexing machine comprising a base, a member movably mounted on the base, a first pair of sprocket gears mounted at spaced locations on the member, a continuous chain wrapped around the first pair of sprocket gears to define a chain run extending between the gears, a plurality of work carriers mounted on the chain at regular intervals along the length of the chain, a plurality of work stations on the base adjacent the chain run, the work stations being spaced apart at the same intervals the work carriers are spaced apart on the chain, a drive for continuously moving the chain along the run and for rotating the first pair of gears, a rotary cam member attached to one of the first pair of gears including a circumferential cam surface having at least one high point and at least one valley, and a cam follower mounted on the base and engagable with the cam surface, the first rotary angle between a valley and an adjacent high point in the direction of rotation of the cam member being different than the second rotary angle between a high point and an adjacent valley in the same direction of rotation of the cam member.

2. An indexing machine as in claim 1 wherein rotation of the cam member through the larger of said first and second rotary angles moves the chain in the run in the same direction the drive moves the chain along the run, and rotation of the cam member through the smaller of the first and second rotary angles dwells the chain in the run with work carriers on the chain located adjacent work stations.

3. An indexing machine as in claim 2 wherein the cam surface includes a plurality of high points and valleys.

4. An indexing machine as in claim 2 wherein said cam surface comprises a continuous circumferential slot extending around the axis of said one gear, said cam follower being located within the slot.

5. An indexing machine as in claim 2 including a rotary carousel located away from the chain run, a plurality of work stations circumferentially spaced around the carousel and wherein said chain is wrapped around the carousel.

6. An indexing machine as in claim 2 including a second pair of sprocket gears located on the side of said first pair of sprocket gears away from the chain run, said second sprocket gears being mounted on the base and located closer between said first pair of sprocket gears, said chain being wrapped around said second pair of sprocket gears.

7. An indexing machine as in claim 2 wherein said member is reciprocably mounted on the face and said run is straight.

8. An indexing machine as in claim 2 wherein the cam follower is located outside the sprocket gears.

9. An indexing machine as in claim 2 wherein the cam follower is located between the sprocket gears.

10. An indexing machine as in claim 1 wherein the circumferential cam surface includes a plurality of like high points and valleys.

11. An indexing machine as in claim 1 wherein said stations include a loading station and an unloading station.

12. An indexing machine comprising a base, an elongate slide bar slidably mounted on a base, the first pair of sprocket gears mounted at spaced locations on the slide bar, a continuous chain wrapped around the first pair of sprocket gears to define a straight chain run extending between the gear along the length of the slide bar, a plurality of work carriers mounted on the chain at regular intervals along the chain, a plurality of work stations on the base adjacent the chain run, the work stations being spaced apart at the same intervals the work carriers are spaced apart on the chain, a drive for continuously moving the chain along the run and for rotating the first pair of gears, a rotary cam member attached to one of the first pair of gears including a circumferential cam surface having at least one high point and one valley, and a cam follower mounted on the base and engagable with the cam surface.

13. An indexing machine as in claim 12 wherein rotation of the cam member from a valley to the next adjacent high point in the direction of rotation moves the chain in the run in the same direction the drive moves the chain along the run, and rotation of the cam member from a high point to the next adjacent valley dwells the chain in the run with work carriers on the chain located adjacent work stations.

14. An indexing machine as in claim 13 wherein the cam surface includes a plurality of high points and valleys.

15. An indexing machine as in claim 13 wherein said cam surface comprises a continuous circumferential slot extending around the axis of said one gear, said cam follower being located within the slot.

16. An indexing machine as in claim 13 including a rotary carousel located away from the chain run, a plurality of work stations circumferentially spaced around the carousel and wherein said chain is wrapped around the carousel.

17. An indexing machine as in claim 13 including a second pair of sprocket gears located on the side of said first pair of sprocket gears away from the chain run, said second sprocket gears being mounted on the base and located closer between said first pair of sprocket gears, said chain being wrapped around said second pair of sprocket gears.

18. An indexing machine as in claim 13 wherein the cam follower is located outside the sprocket gears.

19. An indexing machine as in claim 13 wherein the cam follower is located between the sprocket gears.

20. An indexing machine as in claim 12 wherein the circumferential cam surface includes a plurality of like high points and valleys.

21. An indexing machine as in claim 12 wherein said stations include a loading station and an unloading station.

22. An indexing machine as in claim 12 wherein the first rotary angle between a valley and an adjacent high point in the direction of rotation of the cam member is different than the second rotary angle between a high point and an adjacent valley in the same direction of rotation of the cam member.

23. An indexing machine as in claim 22 wherein rotation of the cam member through the larger of said first and second rotary angles moves the chain in the run in the same direction the drive moves the chain along the run, and rotation of the cam member through the smaller of the first and second rotary angles dwells the chain the run with work carriers on the chain located adjacent work stations.

* * * * *